United States Patent [19]

Kolbert

[11] Patent Number: 4,991,209
[45] Date of Patent: Feb. 5, 1991

[54] RANDOM LOCAL MESSAGE ENCRYPTION

[75] Inventor: Melvin Kolbert, Boca Raton, Fla.

[73] Assignee: Grumman Aerospace Corporation, Bethpage, N.Y.

[21] Appl. No.: 258,349

[22] Filed: Oct. 17, 1988

[51] Int. Cl.5 .............................................. H04L 9/28
[52] U.S. Cl. ........................................ 380/28; 380/9; 380/21; 380/46; 380/50; 380/52
[58] Field of Search ......................................... 380/3-6, 380/9, 33, 37, 49, 50, 52, 59, 21, 30, 28, 29, 46; 340/825.73

[56] References Cited

U.S. PATENT DOCUMENTS

| | | | |
|---|---|---|---|
| 2,178,089 | 10/1939 | Walker | 380/9 X |
| 2,463,502 | 3/1949 | Atkins | 380/6 |
| 3,657,477 | 4/1972 | Ehrat | 380/44 |
| 4,171,513 | 10/1979 | Otey et al. | 380/43 |
| 4,182,933 | 1/1980 | Rosenblum | 380/21 |
| 4,200,770 | 4/1980 | Hellman et al. | 380/30 |
| 4,228,321 | 10/1980 | Flanagan | 380/21 |
| 4,276,652 | 6/1981 | McCalmont et al. | 380/34 |
| 4,319,087 | 3/1982 | Varsos | 380/49 |
| 4,324,002 | 4/1982 | Spilker, Jr. | 380/35 |
| 4,500,881 | 2/1985 | Beane | 340/825.73 |
| 4,638,120 | 1/1987 | Herve | 380/46 X |
| 4,811,377 | 3/1989 | Krolopp et al. | 380/3 X |
| 4,876,716 | 10/1989 | Okamoto | 380/21 |

FOREIGN PATENT DOCUMENTS 0111241 8/1980 Japan .
0070634 3/1988 Japan .................................. 380/21

OTHER PUBLICATIONS

"Data-Encryption 'Box' Secures Comm Systems Easily", Electronic Design, Apr. 16, 1981, vol. 29, No. 8, pp. 159-163.

Primary Examiner—Stephen C. Buczinski
Assistant Examiner—Bernarr Earl Gregory
Attorney, Agent, or Firm—Pollock, VandeSande & Priddy

[57] ABSTRACT

Data transmission to an aircraft is secured by encrypting the data between a remote data source and the aircraft. The encryption is initiated when a random number is coupled to the remote location where it is encoded with the data in accordance with a preselected encryption sequence. The encoded data, after transmission to the aircraft, is decoded in the same sequence so that the original data may be retrieved.

5 Claims, 3 Drawing Sheets

RANDOM LOCAL MESSAGE ENCRYPTION

RELATED PATENT APPLICATIONS

This application relates to co-pending applications Ser. No. 224,605, filed July 27, 1988; Ser. No. 258,732, filed Oct. 17, 1988, now U.S. Pat. No. 4924520; and Ser. No. 258,964, filed Oct. 17, 1988, now U.S. Pat. No. 4932057, all filed in the name of Melvin Kolbert and all assigned to the same assignee as the present application.

FIELD OF THE INVENTION

The present invention relates to the encryption of secured data, and more particularly to data encryption utilizing random numbers.

BACKGROUND OF THE INVENTION

In the daily preparation of military aircraft, it is often necessary to store regularly updated security codes, known as crypto-variables or keys into weapon control and other communication systems such as friend or foe identification systems (IFF). This task is currently performed by a portable code storage box which is connected to an aircraft code memory device by means of conventional pin connectors. In the naval fleet this transfer of security codes to an aircraft is done during pre-dawn hours in all types of weather and sea conditions. On an aircraft carrier, this is manually performed by a cryptocustodian to aircraft that rests on the flight and hanger decks.

Although the procedure is generally satisfactory, it is a time-consuming one requiring proper connector hook-up between aircraft and the custodian's portable security code box. Due to the harsh environment, connectors often deteriorate and the reliability of the connectors is limited. Typically, such connectors are called upon to transfer digital security codes to an internal code memory of the aircraft. When the connectors between the portable code box and the aircraft evidence physical or electrical deterioration, errors in code transfer are possible.

In my co-pending patent application Ser. No. 224,605, filed July 27, 1988, a coupling device was disclosed which preferably magnetically transfers data and circuit power to an aircraft security code storage circuit without the inclusion of mechanical pin connectors. In the environment of an aircraft, the conventional custodian's security code portable transfer box is equipped with a sending unit which is magnetically attached to the exterior of an aircraft skin. At an aligned position along the interior surface of the skin is a receiving pick-up unit which magnetically picks up the digital code and low voltage power being transferred by the sending unit. The sending unit is easily removed after signal and power transfer have taken place by simply detaching it from the aircraft. As will be appreciated, such a simple and elegant technique avoids the problems of pin-type connectors which have been employed heretofore.

In actual utilization of the coupler described, it is impossible to completely eliminate electromagnetic radiation which might be detected by a nearby intruder, such as an enemy submarine. Accordingly, it would be highly desirable if the coupled data could be encrypted in a manner that would avoid useful decoding of the coupled data.

BRIEF DESCRIPTION OF THE INVENTION

In the present invention a random number generator, located within an aircraft, generates a random number which is coupled to the sending unit of the coupler, and from there to a data generator. This random number serves to encode the data which is ultimately transmitted, as encrypted data, to the pick-up unit, via the sending unit. Once the encrypted data is received by circuitry within the aircraft, it is decoded in the same sequence as it was encoded during encryption.

Accordingly, if the random number alone or the encoded encrypted data is detected by enemy surveillance equipment, the true data itself cannot be decoded since the decoding sequence is only properly performed by compatible encoding and decoding equipment of the present invention. Therefore, the utilization of a connector-free coupler may be employed to transfer data between a data generator and an aircraft without fear of breaching security of the data.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 4:
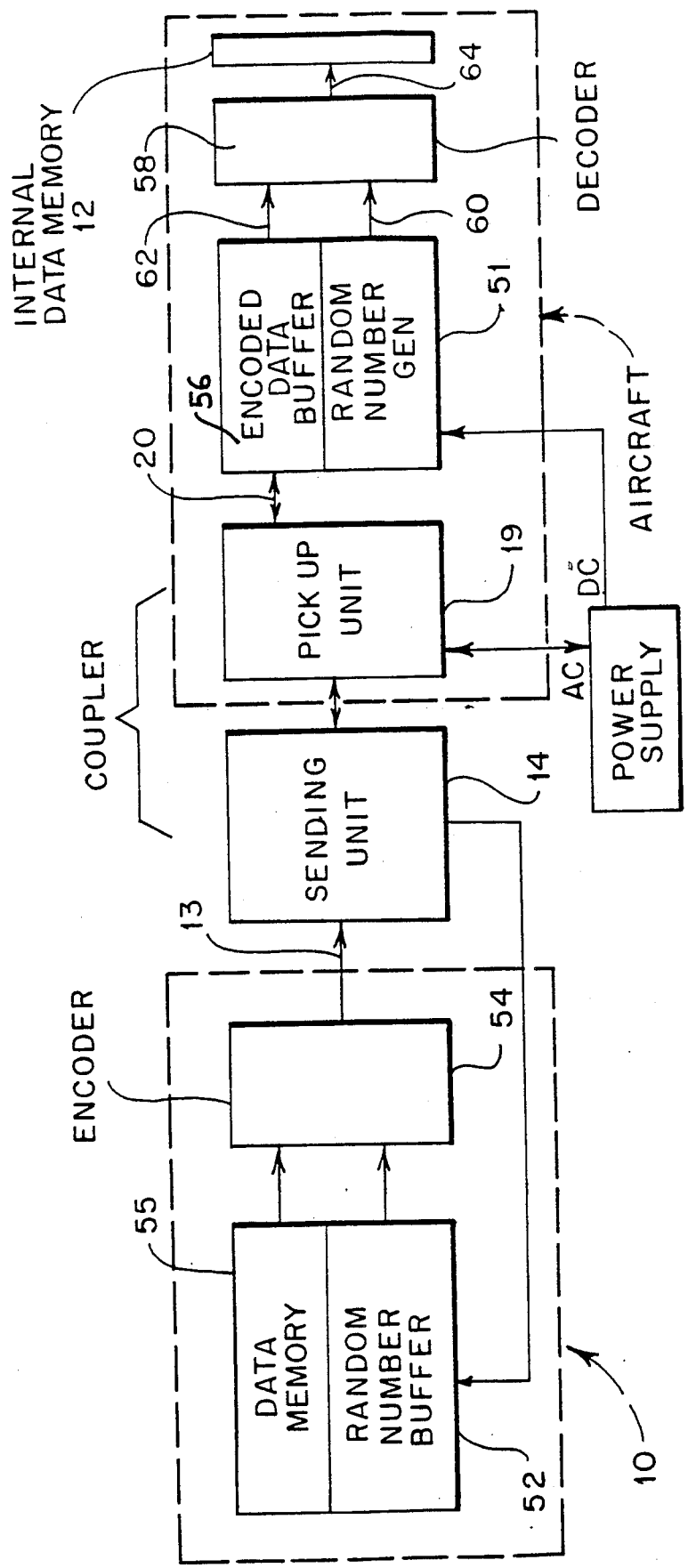
FIG. 4 is a block diagram of the present invention.

Prior to a discussion of the encryption process and means forming the present invention as depicted in FIG. 4, a detailed description of the signal coupling system of my mentioned co-pending application will be discussed.

Figure 1:
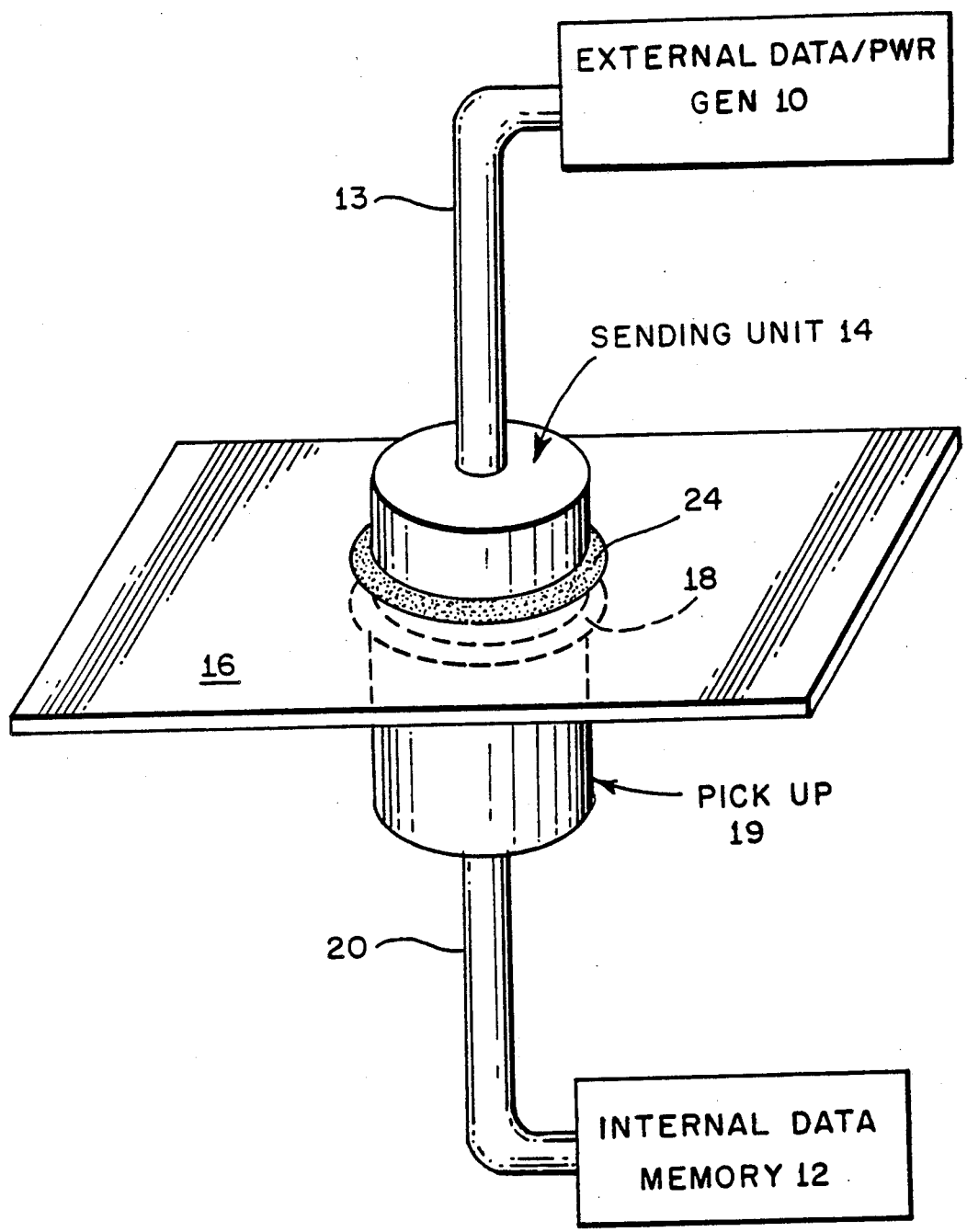
FIG. 1 is a diagrammatic illustration of the installation of a data coupler on an aircraft skin.

FIG. 1 is a diagrammatic view showing the coupler of my co-pending application, shown installed on an aircraft skin. The portable code box discussed in the Background of the Invention is indicated as an external data/power generator 10 in FIG. 1. Such an external storing generator has long been used in the prior art. In addition to being able to read out stored data, the generator 10 is supplied with a switch (Inverter) that initially powers an internal aircraft memory circuit when the aircraft's own power is off, thereby enabling a memory to start its data storage operation and send confirmation control signals back to the generator 10.

Figure 2:
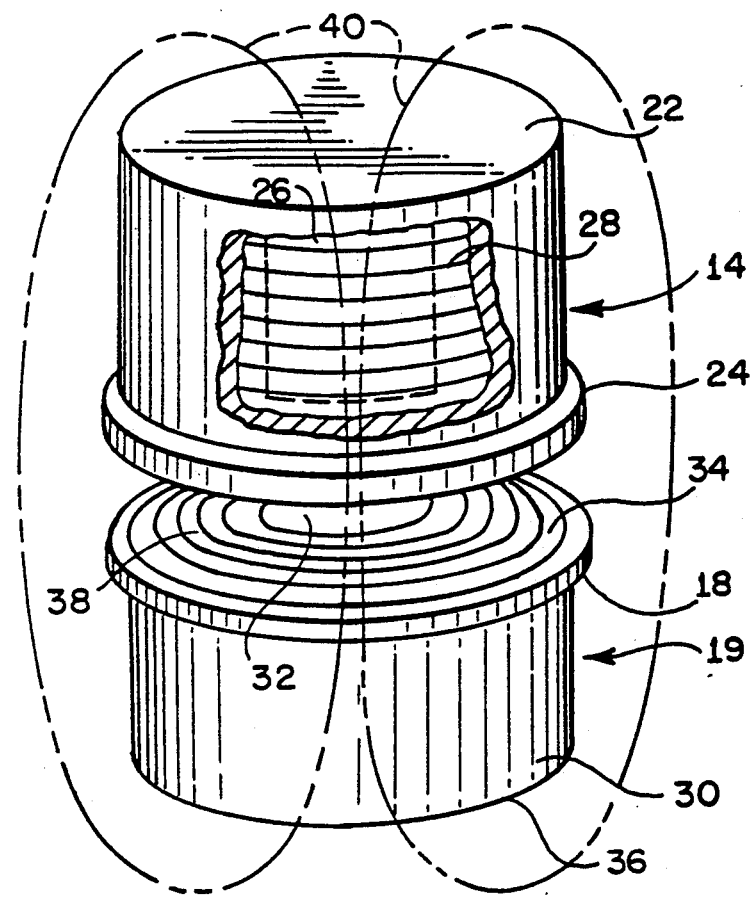
FIG. 2 is a cut-away diagrammatic view of a magnetic induction sending and pick-up pair, constituting a coupler, for which the present invention is intended.

The coupling of power and data from the generator 10 includes a cable 13 connected at a first end to generator 10 and at an opposite end to a sending unit 14. For example, such a unit may be an inductive primary unit as shown in FIG. 2 and discussed hereinafter.

The sending unit 14 is equipped with a circular magnetic ring 24, which may be of the gasket type used in home refrigerators. A mating magnetic ring 18 is appropriately cemented to the internal surface of an aircraft skin 16. The sending unit 14 is detachable from the aircraft skin by simply exerting sufficient tension. Of course, other types of temporary attachment may be employed such as suction, velcro, etc.

A complementary inductive pick-up unit 19 may be permanently cemented to the interior surface of the aircraft skin 16 or it may be temporarily mounted by utilizing ring magnets or the like, as just discussed in connection with the sending unit 14. Signals sent from generator 10 through the sending unit 14 are inductively picked-up by the pick-up unit 19 and transferred to an internal data memory 12 by means of a cable 20.

In operation of the device illustrated in FIG. 1, power may be supplied from the external data/power generator 10 to the internal data memory 12 in order to power the memory circuits if the aircraft power supply is turned off. The data memory circuits 12 are of the type that already exist aboard military aircraft. After the memory circuits have been sufficiently energized, the generator 10 may be switched to a data transmission mode so that the sending unit and pick-up units 14 and 19, respectively, may couple the data to the data memory 12.

The particular structure of the inductive coupling units 14 and 19 are illustrated in greater detail in FIG. 2. However, it is to be emphasized that other types of sending and pick-up units, other than the particular inductive units illustrated in FIG. 2, may be employed. For example, other types of magnetic, capacitive, sonic or vibratory transducers are technically feasible.

The particular magnetic inductance units shown in FIG. 2 include a sending unit 14 having a ferromagnetic housing 22 with a ring magnet, preferably a rubber gasket type ring magnet 24 cemented around the bottom periphery thereof. The magnet is for detachable connection to the aircraft skin by means of the magnets internally cemented thereto, as previously mentioned. A cylindrical ferromagnetic coil form is axially disposed within the housing 22 and serves as a core for windings 28 also located within the housing. The winding 28 serves as a primary winding and cooperates with a secondary winding, located within the pick-up unit 19, as will be discussed hereinafter. An electromagnetic field is created between the primary winding 28, core 26 and the housing 22.

The pick-up unit 19 includes a similar structure, namely, a central ferromagnetic core 32 with a secondary winding 38 secured thereto and a ferromagnetic housing 30 which may be opened on the illustrated top end 34 to allow the sending structure to be cemented, at this end, to the interior surface of an aircraft skin. Alternately, this end may be enclosed and detachably mounted to the interior surface of an aircraft skin by means of ring magnets, as discussed in connection with FIG. 1. The opposite end 36 of the pick-up unit 19 is closed. An electromagnetic field is created between the cores 26 and 32 via housings 22 and 30. When the sending and pick-up units are positioned on opposite sides of an aircraft skin, the two units are inductively coupled and magnetic flux lines link the two, as indicated by reference numeral 40.

Figure 3:
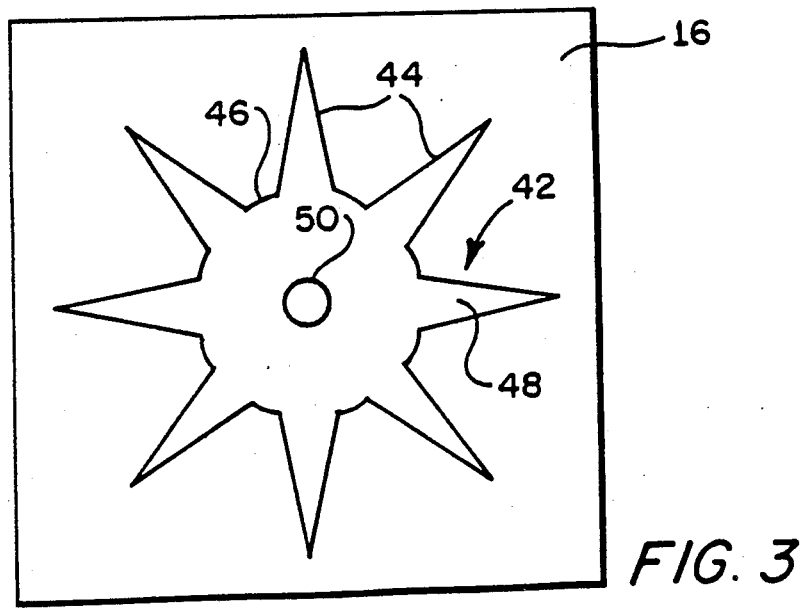
FIG. 3 is a diagrammatic elevational view of a section of an aircraft skin to which a sending unit, such as shown in FIG. 2, is attached.

In order to minimize power dissipation of the coupled signal and power, it would be preferable to have the area of the aircraft skin between the sending and pick-up units fabricated from a non-conducting material. This is a preferable design consideration when high frequencies are employed or otherwise, unwanted eddy currents may develop. In order to maximize the structural connection of a non-conductive area to a conductive aircraft skin, a slotted configuration as shown in FIG. 3 may be employed. In this figure, an area of the aircraft skin 16 has a star-shaped slot 42 cut therein. The void created is filled with a non-conductive material so as to completely fill the slot as indicated by reference numeral 48. The slot itself is characterized by pointed projections 44 interconnected around a circular boundary 46. The utilization of the pointed projections increases the electrical and electromagnetic resistance of the aircraft skin in the vicinity of installation for sending and pick-up units which results in a decrease of power dissipation between the sending and pick-up units. In addition, the projections serve to mechanically interlock the non-conductive material 48 to the aircraft skin 16, this being an important consideration in the harsh environment encountered along the outer skin of a military high-speed aircraft.

The center of the filled-in slot may have a central spot 50 painted thereon so as to guide the center placement of the sending unit 14 when data and power are to be inductively coupled.

Although a simplified inductive coupling is illustrated in connection with the sending and pick-up units, it is also possible to use multiple coils to separate the coupled signal and power so that two distinctive coupling paths are created.

In order to understand how the present invention cooperates with the system of my co-pending application as just discussed, reference is made to FIG. 4.

In operation of the system illustrated in FIG. 4, the operational sequence generally begins after power is coupled to the internal data memory 12 as previously discussed. Afterwards, the data generator 10 couples a start command to the control circuits of memory 12 in a conventional manner. A random number generator 51 located within the aircraft generates a random number and outputs it to the pick-up unit 19. Since the pick-up unit and sending unit are symmetrical and inductively coupled devices, the pick-up unit acts as a primary at this time, while the sending unit 14 acts as a secondary. The random number becomes stored in buffer 52 which is located in the data generator 10. The data stored in memory 55 and the random number are encoded in an encoder 54 in accordance with a specific sequence. The encoded data now represents an encryption of the basic data by the random number. Wire 13 connects the output of encoder 54 to the sending unit 14 so that the encoded data may be coupled to the pick-up unit 19. The latter unit then outputs the encoded data to buffer 56 within the aircraft. A decoder 58 has its inputs 60, 62 respectively connected to the random number generator and the encoded data buffer so that the encrypted data may be decoded in accordance with the same specific sequence governing the encoder 54. The output 64 of the decoder then delivers the decoded data to the internal data memory 12 for use by other data or communication equipment on board the aircraft in a conventional fashion.

To further increase the security of communication, it is intended that each aircraft generate a different random number when the data generator 10 is coupled to succeeding aircraft.

As will be appreciated from the preceding description of the invention, the encryption of sensitive data with a random number secures the data communicated to an aircraft, even in an environment where enemy detection of the transmitted encrypted data occurs.

Although the inventive encryption system is described in connection with an inductive coupler for coupling data through an aircraft skin, it is emphasized that the present invention has broader application.

Namely, encryption of data which is transmitted between two spaced locations.

It should be understood that the invention is not limited to the exact details of construction shown and described herein for obvious modifications will occur to persons skilled in the art.

I claim:

1. A data encryption system for aircraft comprising:
   a random number generator located on board the aircraft;
   coupling means for transmitting the random number out through the aircraft skin to first buffer means in an external portable box;
   means located in the box for storing fixed data to be encrypted;
   encoding means located in the box for encoding the data with the random number in a predetermined encryption sequence;
   second buffer means in the aircraft for storing the encrypted data after secure transmission thereto, back through the aircraft skin, by the coupling means;
   decoding means in the aircraft for decoding the stored encrypted data in accordance with the encryption sequence; and
   means in the aircraft for storing the data.

2. The structure set forth in claim 1 wherein the coupling means comprises:
   a first unit located entirely within the interior aircraft skin surface; and
   a second unit detachably mounted to the exterior of the aircraft skin, in alignment with the first unit for coupling bi-directional signal transmission through the skin.

3. The structure set forth in claim 2 wherein the coupling means comprises first and second inductively coupled units.

4. A method for encrypting data transmission between a portable data box and an aircraft comprising the steps:
   generating a random number aboard the aircraft;
   coupling the random number out through the aircraft skin, in the absence of physical connection, for storing the random number in the portable box;
   storing the data to be encrypted in the portable box;
   encoding the data with the random number, in the box, in a predetermined encryption sequence;
   coupling the resulting encrypted data back through the aircraft skin for storage in the aircraft;
   decoding the stored encrypted data in accordance with the encryption sequence; and
   storing the decoded data, now identical to the data in the portable box, in the aircraft.

5. The method set forth in claim 4 wherein each step of coupling is achieved by inductive coupling.

* * * * *